United States Patent [19]

Lamonica

[11] Patent Number: 4,520,035
[45] Date of Patent: May 28, 1985

[54] PIZZA DOUGH PACKAGE AND METHOD OF MAKING SAME

[76] Inventor: Mark A. Lamonica, 1533 85th St., Brooklyn, N.Y. 11228

[21] Appl. No.: 528,864

[22] Filed: Sep. 2, 1983

Related U.S. Application Data

[63] Continuation of Ser. No. 379,469, May 18, 1982, abandoned.

[51] Int. Cl.³ ............................................. A21D 10/02
[52] U.S. Cl. ..................................... 426/128; 426/124; 426/420; 426/502; 426/393; 426/132
[58] Field of Search ............... 426/128, 119, 120, 124, 426/115, 420, 502, 393; 229/87 F

[56] References Cited

U.S. PATENT DOCUMENTS

| | | | |
|---|---|---|---|
| 1,988,058 | 1/1935 | Traller | 426/128 |
| 2,302,350 | 11/1942 | Roth | 426/128 |
| 2,509,035 | 5/1950 | Corbett | 426/128 |
| 2,555,033 | 5/1951 | Harris | 426/128 |
| 2,673,807 | 3/1954 | Berg | 426/128 |
| 2,726,156 | 12/1955 | Armstrong | 426/128 |
| 2,745,753 | 5/1956 | Ayres | 426/128 |
| 2,784,103 | 3/1957 | Paxton | 426/88 |
| 3,338,722 | 8/1967 | Long | 426/120 |

Primary Examiner—Steven Weinstein
Attorney, Agent, or Firm—Frishauf, Holtz, Goodman & Woodward

[57] ABSTRACT

A package of uncooked pizza dough is formed by folding a disk-shaped layer of dough over precut sections of wax paper or other release paper along parallel pairs of chord lines of specified chord height, defined by the wax paper sections, to form a compact package which is easily made, convenient to transport, efficient in use of materials, and readily stored and unfolded to the disk shape at a home or restaurant, so that manual shaping of the dough to disk form from a block of dough is unnecessary.

11 Claims, 5 Drawing Figures

PIZZA DOUGH PACKAGE AND METHOD OF MAKING SAME

This application is a continuation of Ser. No. 379,469, filed May 18, 1982, now abandoned.

BACKGROUND OF THE INVENTION

This invention relates to a pizza dough package and a method for making the same.

It is common practice for a pizza restaurant to purchase blocks of pizza dough from a distributor thereof. The restaurant stores the dough blocks until needed, in stacked form. When a pizza pie is ordered by a customer, the restaurant takes a dough block and manually shapes it to the desired disk form, a process which requires relatively expensive skilled manual labor. After shaping, the disk-shaped layer of dough is covered with the desired additional ingredients, placed in a pizza oven and cooked.

For home use, frozen pizzas are often sold in supermarkets, complete with all of the ingredients thereon, ready for cooking or heating up. It would be desirable to merely sell the disk-shaped pizza dough to a homemaker so that the homemaker can then add the additional ingredients, as desired. However, due to the large and unwieldy shape of the formed disk-shaped pizza dough, shipping and storage is inconvenient and would often lead to breakage or cracking of the disk due to its brittleness when frozen in the large disk-shaped form.

Thus, it is not practical for the distributor to manufacture and ship the pizza dough in frozen disk form, as packages of the dough so shaped are inconvenient to ship and to handle. Moreover, such packages are inefficient in utilization of packing space since the disks are round and the packages are generally rectangular, leaving empty packing space in the corners. Still further, the frozen disks are brittle and are easily broken or cracked during shipping and handling.

Accordingly, it is an object of the present invention to provide an improved pizza dough package and method for making the same, overcoming the aforementioned disadvantages.

SUMMARY OF THE INVENTION

As herein described, a package of uncooked pizza dough is formed by folding a disk-shaped layer of dough over precut sections of wax paper (or other release paper) along parallel pairs of chord lines of specified chord height, defined by the release paper sections, to form a compact package which is easily made, convenient to transport, and readily stored and unfolded by the user, so that shaping of the dough is unnecessary. The folded package of dough of the invention may be frozen for shipping and storage. After defrosting of the frozen package, the dough is unfolded to the disk shape for use.

DETAILED DESCRIPTION

Figure 1:
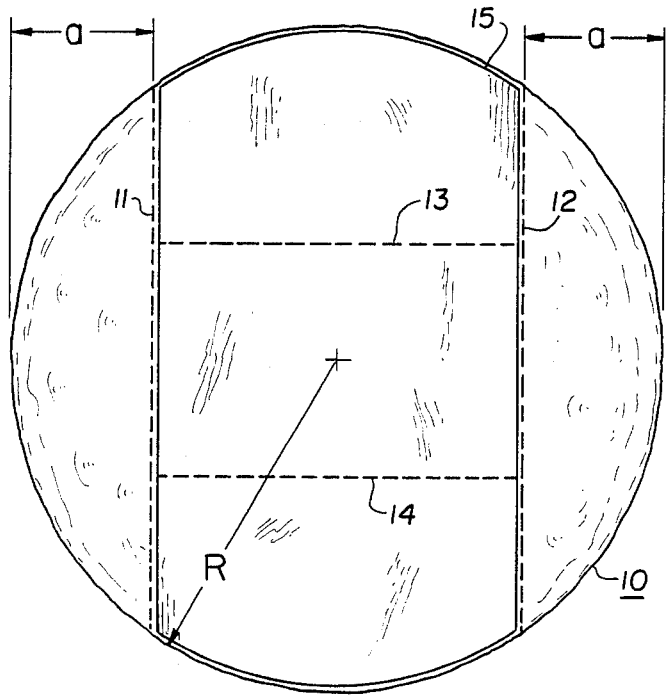
FIG. 1 shows a pre-stretched uncooked pizza dough preform used in the package and method according to a preferred embodiment of the present invention, the central portion of said preform being covered by a precut sheet of non-adhesive material.

As seen in FIG. 1, a preform 10 comprises a disk-shaped layer of pre-stretched uncooked pizza dough, which is to be folded into a compact package for packing, freezing, shipment and later use. The layer 10 will first be folded inward along parallel chord lines 11 and 12; and subsequently folded inward along a second pair of parallel chord lines 13 and 14, the chord lines 13 and 14 being perpendicular to the chord lines 11 and 12.

The corresponding heights a of the chord lines 11 and 12 should be less than half the radius R of the layer 10, so that the adjacent edges of the layer 10 will not touch each other when inward folds are made along the lines 11 and 12. Preferably, the chord heights a should be in the range of 35% to 45% of the radius R.

The chord heights b (see FIG. 2) corresponding to the chord lines 13 and 14, should be between 50% and 100% of the disk radius R. Preferably, the chord heights b should be in the range of about 60% to about 70 or 75% of said radius. In order to make the package, a precut sheet 15 of non-adhesive material is placed over the central portion of the layer 10, so that the parallel edges of the precut sheet 15 define the chord lines 11 and 12.

The sheet 15 may be of any material which is essentially chemically inert and non-adhesive with respect to the pizza dough comprising the layer 10. Preferably, the sheet 15 may comprise a waxed paper, aluminum foil, a suitable plastic such as polyethylene, or any other suitable type of release sheet, hereinafter referred to as release sheet, release material, or the like.

Figure 2:
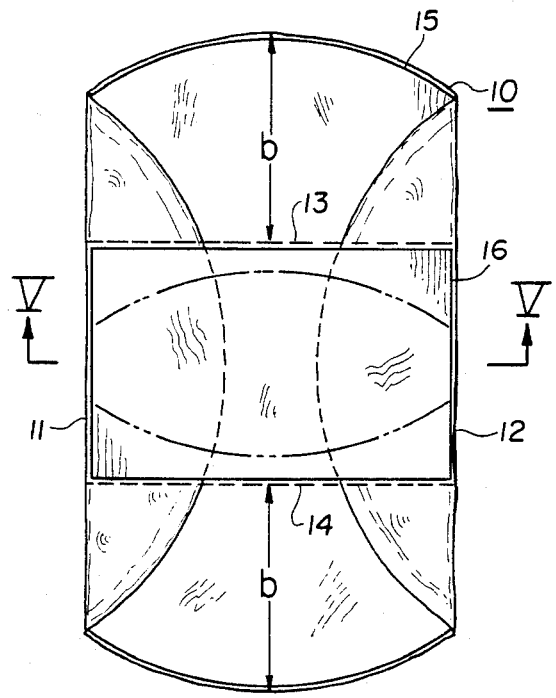
FIG. 2 shows an intermediate stage in the making of said package.
Figure 5:
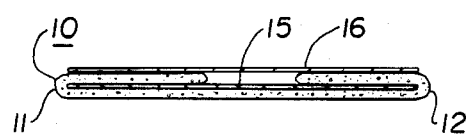
FIG. 5 is a sectional view along line V—V in FIG. 2.

The next step is the inward folding of the layer 10 along the chord lines 11 and 12 defined by the parallel edges of the precut sheet 15, to provide an intermediate structure as shown in FIG. 2.

Then a second precut release sheet 16, of rectangular shape, is placed over the central portion of the intermediate structure shown in FIG. 2, so that one pair of parallel edges of the sheet 16 lie essentially along the chord lines 11 and 12, while the other pair of parallel edges of the sheet 16 define the chord lines 13 and 14.

Figure 3:
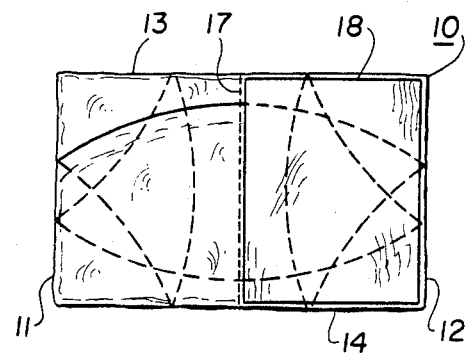
FIG. 3 shows the finished package in a first embodiment, or a second intermediate stage in the making of said package according to a second embodiment.

Next, the preform 10 is folded inward along the chord line 13, after which an additional sheet of release material 19 (see FIG. 4) is placed thereon; and thereafter the preform 10 is folded inward along the chord line 14 to provide the compact package shown in FIG. 3.

With this arrangement, a minimum quantity of release sheet material is utilized; the release sheets 15 and 16 serve as folding guides to enable the uniform assembly of the package by essentially unskilled workers; and the adjacent juxtaposed layers of pizza dough in the completed package are separated from each other by release sheets.

The resulting package is compact and easily handled, transported and stored; and can be readily unfolded to the original disk-shaped configuration shown in FIG. 1, after defrosting (when frozen), without distortions which would otherwise be caused by the sticking together of adjacent portions of the preform 10.

Figure 4:
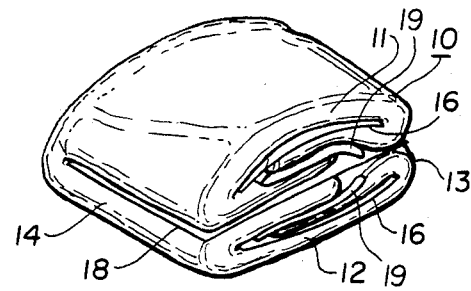
FIG. 4 is an isometric drawing of the pizza dough in the finished package according to said second embodiment, drawn to a larger scale.

If desired, the compact package of FIG. 3 may be reduced further in size by folding it once more along line 17 after a release sheet 18 is placed on the right side of the center line 17, as seen in FIG. 3. The resulting more compact package is shown in FIG. 4. For larger pie forms, the additional folding along line 17 in FIG. 3 is desireable to provide a more compact package of dough which is more easily handled and packed in cartons, boxes, or the like.

I claim:

1. A folded pizza dough package comprising:
   an initially disk-shaped layer of uncooked pizza dough,
   means including a first sheet of precut release material placed substantially centrally on said disk-shaped layer and having two spaced substantially straight peripheral edges defining first and second substantially parallel chord lines relative to the respective adjacent curved edge of said disk-shaped layer for folding said disk-shaped layer inwardly therealong, the corresponding chord heights of each chord lines being less than half the radius of said layer, said first sheet of precut release material defining a substantially arc shape at the peripheral portions thereof between said first and second chord lines and said arc-shaped peripheral portions extending substantially to the periphery of said initially disk-shaped layer of uncooked pizza dough between said first and second chord lines of said sheet of release material;
   said disk-shaped layer being inwardly folded along and around said first and second chord lines of said first sheet of release material such that the juxtaposed portions of said disk-shaped layer produced by said inwardly folding of said disk-shaped layer along said first and second chord lines are separated by said first sheet of release material;
   said inwardly folded portions of said disk-shaped layer not overlapping each other; and
   a second precut sheet of release material extending between said two spaced edges of said first sheet of release material which define said first and second chord lines, said second sheet of release material having two spaced substantially straight peripheral edges which are substantially perpendicular to said first and second chord lines and which define third and fourth substantially parallel chord lines relative to the respective adjacent curved edge of said disk-shaped layer, the corresponding chord heights of said third and fourth chord lines being between 50% and 100% of the radius of said disk-shaped layer, said third and fourth chord lines defining fold lines for folding said disk-shaped layer inwardly therealong after said first-mentioned folding thereof, said second sheet of release material being placed on said pizza dough after folding of said disk-shaped layer inwardly along said first and second chord lines of said first sheet of release material, and said pizza dough being then folded inwardly along and around said third and fourth chord lines and over said second sheet of release material;
   a third precut sheet of release material being placed over the portion of the pizza dough folded over one of the third and fourth chord lines before folding of the pizza dough over the other of said third and fourth chord lines so that layers of pizza dough do not directly contact each other;
   whereby the resultant folded pizza dough has a substantially rectangular compact shape and is readily unfoldable and separable from said release sheets to assume said initial disk-shape.

2. The folded pizza dough package of claim 1, further comprising a fourth pre-cut sheet of release material having a substantially straight peripheral edge which extends substantially perpendicular to said third and fourth chord lines, said fourth sheet of release material being on top of the substantially rectangular folded pizza dough and extending substantially between said third and fourth chord lines, said substantially straight edge of said fourth sheet of release material defining a fold line substantially centrally between said first and second chord lines for folding said disc-shaped layer inwardly therealong after said folding of said disk-shaped layer around said third and fourth chord lines to thereby produce a more compact, rectangular shaped package of folded pizza dough which is readily unfoldable and separable from said release sheets to assume said initial disk-shape.

3. The folded pizza dough package of claim 1, wherein the chord heights corresponding to said first chord lines are in the range of 35% to 45% of the radius of said disk-shaped layer.

4. The folded pizza dough package of claim 3, wherein the chord heights corresponding to said third and fourth chord lines are in the range of about 60% to about 75% of the radius of said disk-shaped layer.

5. The folded pizza dough package of claim 1, wherein the chord heights corresponding to said third and fourth chord lines are in the range of about 60% to about 75% of the radius of said disk-shaped layer.

6. The folded pizza dough package of claim 1, wherein said second sheet of release material is smaller than said first sheet of release material, and said third sheet of release material is smaller than said second sheet of release material.

7. A method for making a compactly folded substantially rectangular pizza dough package comprising the steps of:
   providing a preform comprising an initially disk-shaped layer of uncooked pizza dough,
   covering a central portion of said preform with a first precut sheet of non-adhesive release material, said first sheet of release material having two spaced substantially straight peripheral edges defining first and second substantially parallel chord lines relative to the respective adjacent curved edge of said disk-shaped layer for defining fold lines for folding said disk-shaped preform inwardly therealong, the corresponding chord heights of each said chord lines being less than half the radius of said preform, said first sheet of precut release material defining a substantially arc shape at the peripheral portions thereof between said first and second chord lines and said arc-shaped peripheral portions extending substantially to the periphery of said initially disk-shaped preform of uncooked pizza dough between said first and second chord lines of said sheet of release material;
   then inwardly folding said preform along and around said first and second chord lines of said first sheet of release material and onto said first sheet of release material such that the juxtaposed portions of said preform produced by said inwardly folding of said preform along said first and second chord lines are separated by said first sheet of release material, and such that said inwardly folded portions of said preform do not overlap each other;

then covering a central portion of the folded preform with a second precut sheet of non-adhesive release material smaller than said first sheet of release material and extending between said two spaced edges of said first sheet of release material which define said first and second chord lines, said second sheet of release material having two spaced substantially straight peripheral edges which are substantially perpendicular to said first and second chord lines and which define third and fourth substantially parallel chord lines relative to the respective adjacent curved edge of said disk-shaped layer, the corresponding chord heights of said third and fourth chord lines being between 50% and 100% of the radius of said disk-shaped preform, said third and fourth chord lines defining fold lines for folding said already folded disk-shaped preform inwardly therealong after said first-mentioned folding thereof;

then folding said first folded pizza dough inwardly along and around one of said third and fourth chord lines and over said second sheet of release material;

then covering a portion of the last folded portion of said pizza dough with a third precut sheet of release material; and then folding said pizza dough inwardly along and around the other of said third and fourth chord lines and over said third sheet of release material;

the resultant folded pizza dough having no directly contacting adjacent layers, having a substantially rectangular compact shape and being readily unfoldable and separable from said release sheets to assume said initial disk-shape.

8. The method of claim 7, further comprising covering half of the folded rectangular pizza dough with a further precut sheet of non-adhesive release material having a substantially straight peripheral edge which extends substantially perpendicular to said third and fourth chord lines, said further sheet of release material extending substantially between said third and fourth chord lines, said substantially straight edge of said further sheet of release material defining a further fold line substantially centrally between said first and second chord lines for folding said folded pizza dough inwardly therealong; and then folding said folded rectangular pizza dough inwardly along and around said further fold line and over said further sheet of release material to thereby produce a more compact, rectangular-shaped package of folded pizza dough which is readily unfoldable and separable from release sheets to assume said initial disk-shape.

9. The method of claim 7, wherein the chord heights corresponding to said first chord lines are in the range of 35% to 45% of the radius of said disk-shaped preform.

10. The method of claim 9, wherein said chord heights corresponding to said third and fourth chord lines are in the range of about 60% to about 75% of the radius of said disk-shaped preform.

11. The method of claim 7, wherein the chord heights corresponding to said third and fourth chord lines are in the range of about 60% to about 75% of the radius of said disk-shaped preform.

* * * * *